United States Patent [19]
Wickert

[11] 3,922,916
[45] Dec. 2, 1975

[54] SAMPLER FOR MOLTEN MATERIALS

[75] Inventor: Charles J. Wickert, Willow Grove, Pa.

[73] Assignee: Leeds & Northrup Company, North Wales, Pa.

[22] Filed: July 15, 1974

[21] Appl. No.: 488,367

[52] U.S. Cl. .................................................. 73/354
[51] Int. Cl.² .......................................... G01N 1/10
[58] Field of Search ............. 73/354, 425.4, DIG. 9; 339/94, 116; 136/234, 235

[56] References Cited
UNITED STATES PATENTS

| | | | |
|---|---|---|---|
| 3,455,164 | 7/1969 | Boyle | 73/354 |
| 3,594,696 | 7/1971 | Witek | 339/94 |
| 3,785,947 | 1/1974 | Baldwin | 136/234 |

Primary Examiner—S. Clement Swisher
Attorney, Agent, or Firm—Philemon J. Moore; Raymond F. MacKay

[57] ABSTRACT

Immersion samplers for molten materials. The samplers are of the type to be attached to manipulator means for immersing the sampler in a stream of molten material or to the subsurface level of a bath of molten material. The sampler includes a sensing device which may project from the sampler for measuring the temperature of molten material prior to entry thereof into the sampler and/or the sampler may include a cavity having temperature sensing means disposed therein for measuring the temperature of a sample received in the cavity as the sample cools thus, in known manner, to obtain a cooling curve showing one or more arrests at the point or points of phase change so that the content of a constituent of a bath of molten material may be determined. The sampler may include an electrolytic cell structure for the purpose of determining the amount of a gas contained in a bath of molten material. Samplers of the foregoing types are characterized in accordance with applicant's invention by the inclusion of directional venting means and means to seal plug-in electromechanical contact structures in a manner to prevent fouling of the electrical contacts by gases vented from the sample receiving cavity of the sampler.

14 Claims, 6 Drawing Figures

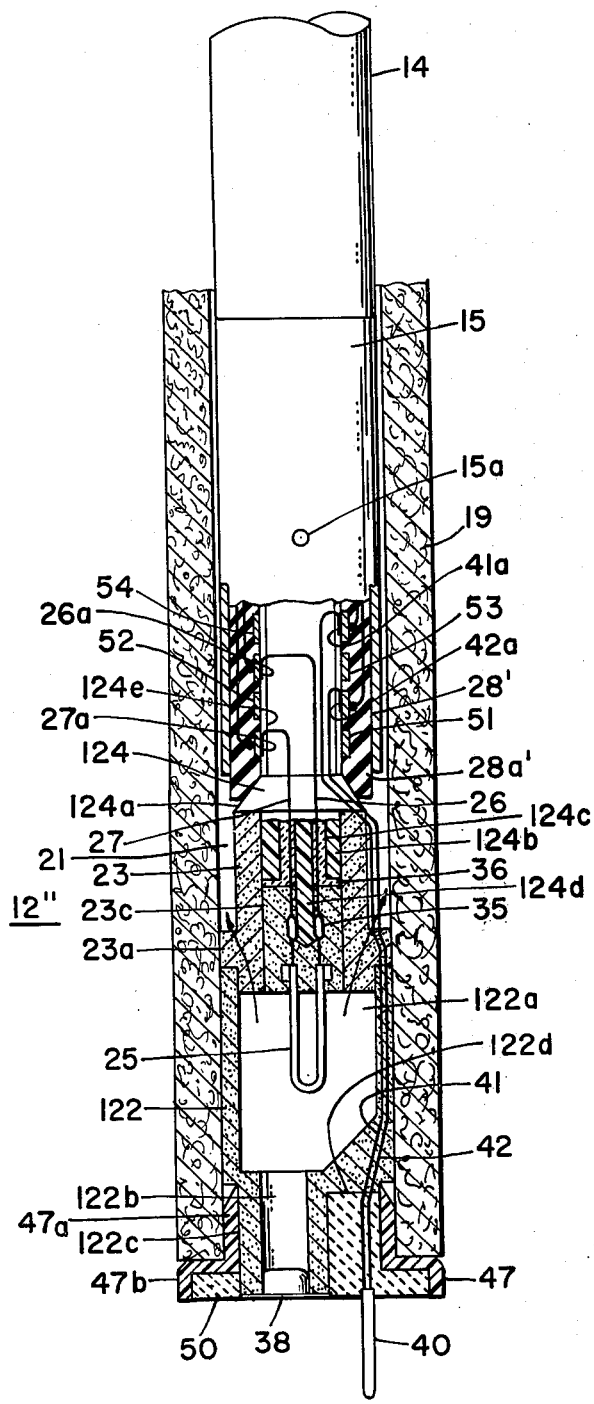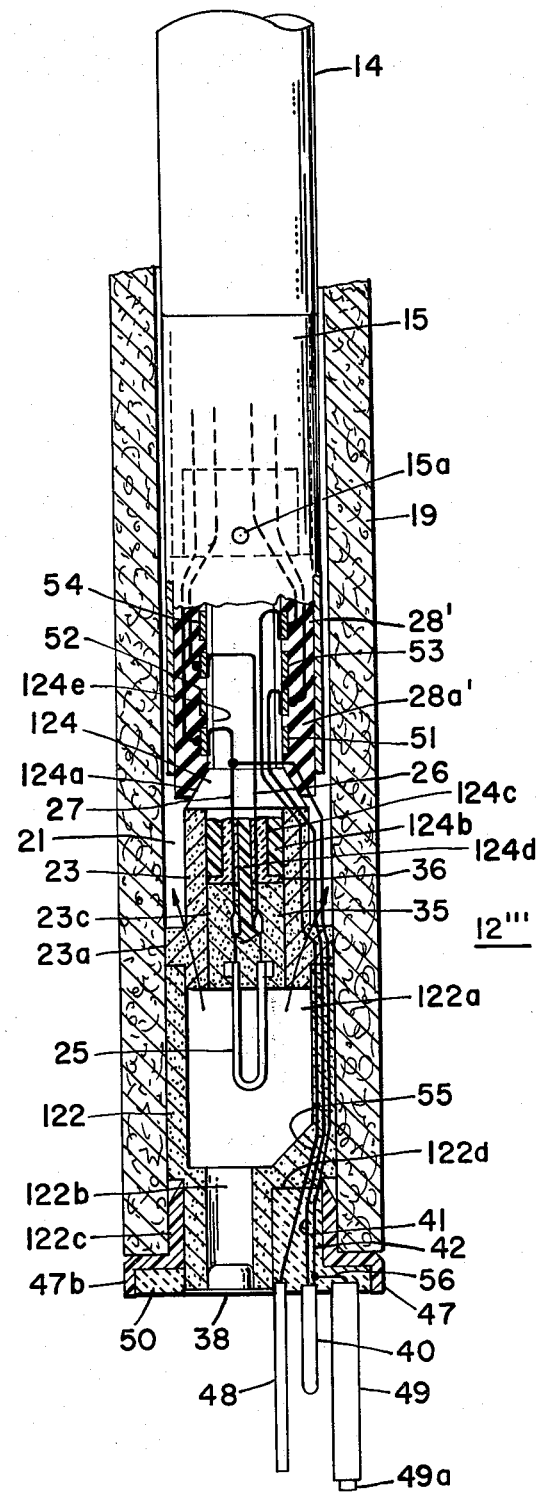

SAMPLER FOR MOLTEN MATERIALS

BACKGROUND OF THE INVENTION

1. Field of the Invention:

Applicant's invention is for use with immersion sampler devices. Such devices are classified in the U.S. Patent Office with items relating to measuring and testing such as samplers and tollers and also with items for measuring and testing which include thermometer means particularly those of the combined type including a sampling cup. To the extent that applicant's invention is usable with devices for measuring the oxygen content of a bath of molten material such as molten iron or molten steel the apparatus relates to chemistry, electrical and wave energy and particularly that relating to processes and products, electrolysis and/or electrolytic apparatus for analysis and testing which includes a solid electrolyte.

2. Description of the Prior Art:

Since the time that expendable immersion thermocouples, such as are described in U.S. Pat. Nos. 2,999,121-H. G. Mead, 3,024,295-P. J. Moore, and 3,048,642-K. B. Parker, Jr. became commercially available many devices utilizing them have come into use. U.S. Pat. No. 3,455,164-G. P. Boyle discloses and claims an immersion molten metal sampler containing internally thereof an expandable thermocouple disposed in a cavity to sense the temperature of a sample of material as it cools within the cavity so that there may be recorded a cooling curve showing an arrest or arrests at temperatures indicating points of phase change from which arrests a constituent of a sample may be determined. In that patent there is also disclosed an immersion sampler device having a thermocouple projecting outwardly of the sampler body structure for sensing the temperature of a bath of molten material and additionally there is disclosed the manufacture of immersion sampler devices utilizing materials which arer porous thus to provide means for venting the sample receiving cavity of the sampler. It has also been disclosed in British Pat. No. 1,212,075 to include with an immersion sampler having one or more temperature sensing means as taught by Boyle an electrode structure for the determination of the oxygen content of a bath of molten material.

As a result of extensive testing of plug-in immersion sampler devices including temperature responsive means applicant discovered that some erratic readings obtained were due to the build-up of deposits on the electrical contacts of the electromechanical plug-in connector structure. It was found that the deposits came from gases exhausted from the sample receiving cavity getting into the connector and depositing electrically conductive solids on the parts thus short-circuiting the plug-in contact structures. Applicant has found that this can be avoided particularly with respect to samplers having body structure made of a porous material by sealing the plug-in electrical contact structure against the ingress of gas and directing the gases vented from the sampler cavity or cavities to a vent passage or passageway from which the gases may flow away from the body structure of the sampler.

SUMMARY OF THE INVENTION

In accordance with applicant's invention there are provided sampler devices for molten material including temperature sensing means and plug-in electromechanical connector structure comprising body structure having walls defining a sample receiving cavity and an entrance thereto to receive and retain a sample of molten material when the entrance to said cavity is immersed in molten material such as that contained in a vessel or a flowing stream. The body structure supports temperature sensing means at a location to sense the temperature of the molten material and the body additionally includes structure supporting electromechanical connector structure having electrical contact elements electrically connected to the temperature sensing means. This connector structure is constructed and arranged for engagement with mating connector structure supported in an end of a manipulator assembly for use in immersing the sampler into a bath or stream of molten material. A tubular member supports the body structure of the sampler in an immersion end thereof and has a length sufficient to surround one end of the manipulator assembly and connector structure. Venting means through one of the walls defining the cavity is provided for venting gas from the cavity into a passageway provided between the tubular member and a portion of the body structure and the manipulator and means is provided for preventing gas exhausted through the venting means into the passageway from entering the connector structure when the connector structure is engaged with the mating connector structure of the manipulator to prevent the formation of deposits on the electrical contacts of the connector structure. In the different modifications the electromechanical connector structure includes a portion of gas impermeable material for effecting fluid tight engagement with mating connector structure.

It is an object in accordance with applicant's invention to provide sampler devices for molten material which devices include a body having wall structure defining a cavity and an entrance thereto for receiving and retaining a sample of molten material. The body supports one or more sensing means having an electrical output the magnitude of which is a function of a characteristic of the molten material such as its temperature and/or the concentration of constituent thereof. The body is supported in an end of a tubular member. The body supports electromechanical connector structure at an end thereof in said tubular member and the improvement comprising a vent passage between a portion of the body and the tubular member at the end of the body supporting the connector, means providing a passage for the flow of gas from the cavity to the vent passage, and means to seal the connector structure against ingress of gases vented from the cavity. The wall structure defining a cavity may comprise mating mold halves with recesses defining a cavity and the means providing a passage may be comprised of grooves in the mold halves. The wall structure defining a cavity may be comprised of porous material permeable to gas in which case gas impermeable material is disposed between the wall structure defining the cavity and the connector structure. The sensing means may comprise temperature sensing means which project outwardly from the body to sense the temperature of molten material into which the entrance is immersed or the sampler may have temperature sensing means which projects into the cavity of the sampler to sense the temperature of molten material in the cavity or the sampler may have two temperature sensing devices one in the cavity and one projecting outwardly of the body and/or the sampler device may include an electromechanical cell and electrode structure for effecting a measurement of a gaseous component of a bath of molten material into which the sampler is immersed.

For a better understanding of applicant's invention, its advantages, and the objects thereof the following description and claims should be read with reference to the accompanying drawings.

BRIEF DESCRIPTION OF THE DRAWINGS

FIG. 5 is a side elevation partly in section of a further modification of applicant's invention, and FIG. 6 is a side elevation partly in section of still another sampler in accordance with applicant's invention.

DESCRIPTION OF THE PREFERRED EMBODIMENTS

Figure 1:
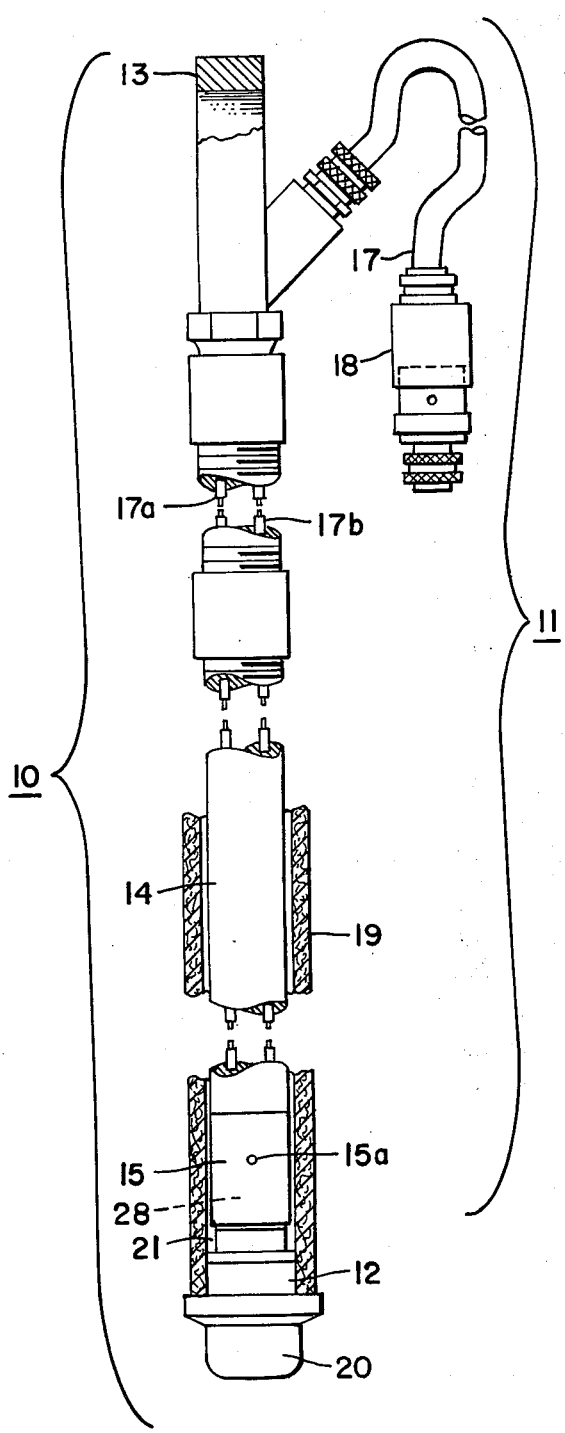
FIG. 1 is a side elevation partly in section illustrating an immersion sampler and manipulator.

In FIG. 1 there is disclosed an immersion sampling apparatus 10 which includes a manipulator section 11 having affixed to the immersion end thereof an immersion sampler device 12. The manipulator section 11 includes a handle 13 affixed by means of a short nipple and pipe couplings to a suitable length of pipe 14. The length of pipe 14 will depend upon where the sampler device is to be immersed, for example, when used in an open hearth furnace pipe 14 may be of the order of 8 to 10 feet long, however, when used in a basic oxygen furnace the length of pipe will be longer. A fitting 15 affixed to the immersion end of the pipe 14 contains electromechanical connector structure 28 secured in the fitting by means of set screws or a pin 15a. The connector structure 28 will be more fully described hereinafter.

Electrically connected to contacts of the connector contained within the fitting 15 is a multiconductor cable 17 for establishing through a connector 18 connection to a measuring device such as a recorder not shown. Manipulator structures of the general type described are shown in the above mentioned Mead, Moore, and Parker, Jr. patents and are well known to those skilled in the art of immersion pyrometry. In the instant application reference is repeatedly made to the immersion end of the manipulator or the immersion end of a sampler device. The language is intended to refer to the lower end of the sampler device 12 as viewed in FIG. 1, that is to say, the end which first enters molten material into which it is immersed.

Still referring to FIG. 1 the immersion sampler device 12 in most instances is secured in and supported by a cylindrical tube 19 which becomes a part of the sampler device. As known to those skilled in the art a thick walled cardboard tube is generally used, however, if it is desired to utilize the sampler in molten material which tends to react violently with the cardboard a different material may be substituted for the cardboard of tube 19. For example, what is known to those skilled in the art as a non-blow or safety tube may be used. Such tubes frequently are comprised of a thin steel liner around which has been wrapped an asbestos impregnated ceramic tape. Of course there are many other refractory materials which are known and have been utilized for such tubes. After insertion of a sampler device 12 into tube 19 where it is retained as by a suitable adhesive material the device in most applications will be capped with a cap 20 of a material which is easily destroyed by the heat of the bath. The cap provides protection for parts prior to use and permits insertion of the sampler device into a bath of molten material through any slag layer which may be covering the bath. The sampler per se will be inserted through the slag to a subsurface level below the slag thereafter the cap 20, which may be of mild steel when molten steel or iron is to be sampled, will melt thus permitting molten material of the bath to flow into the sampler. The cap prevents slag from entering the sampler.

When a sampler containing sensing means is to be immersed the tube portion of the sampler is slid over the pipe 14 of manipulator 11 and plug-in engagement of the mating electromechanical connector structures of the sampler and manipulator is effected. As may be observed in FIG. 1 pipe 14, the fitting 15, and the upper portion of the sampler 12 have outside diameters which are less than the internal diameter of the tube 19 thereby leaving a space between the upper end of the sampler device 12, connector fitting 15, and manipulator pipe 14 and the inside of tube 19 which forms a passageway or vent passage 21 the function of which will be more fully described with reference to FIGS. 2 through 6. Instead of the outside diameter of fitting 15 being less than the internal diameter of tube 19 it may be made a slide fit into the tube and have flats or grooves throughout its length to provide for its share of the vent passage 21.

Figure 2:
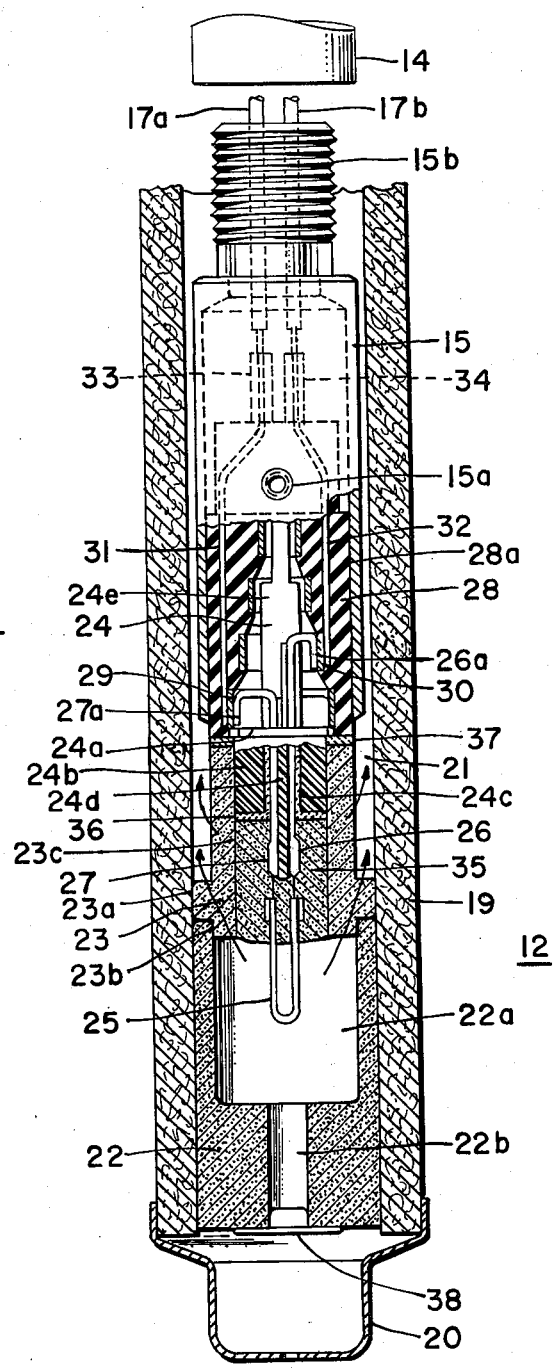
FIG. 2 is a side elevation partly in section illustrative of one modification of applicant's samplers.

In FIG. 2 there is shown on an enlarged scale the details of a sampler including the venting concept in accordance with applicant's invention. The sampler device 12 is comprised of a first body structure element 22 which may be a cylindrical element of shell molded sand. Parts produced by shell molding may be obtained by covering a hot metal pattern or die with a mixture of sand and a resin binder. A resin binder such as a phenol-formaldehyde resin binder is heat setting. The thin shell mold may be produced in various ways one of which is by blowing the sand and resin into the die cavity and the thin mold so formed is then capable of being hardened completely by heating for approximately 3 minutes at a temperature of 300° Centigrade. After baking, the sand shell is lifted from the pattern or die. The piece so formed is a self-supporting structure. For further information as to the shell molding process, reference may be had to the publication "Tool and Manufacturing Engineering," Volume 46, January 1961, and the references listed on page 116 thereof which is referred to in U.S. Pat. No. Re. 26,409-R. J. Hance and U.S. Pat. No. 3,455,164-G. P. Boyle.

The first body structure element 22 includes a cylindrical counterbore the walls of which together with the walls of other portions of the body structure define a molten metal receiving cavity 22a. A hole through body structure element 22 connecting the cavity 22a with the outside of the body element provides an entrance 22b to the cavity. A second body structure element 23 which likewise may be of shell molded sand has an annular rib portion 23a forming a shoulder 23b so that the lower end of element 23 may be inserted into the upper end of element 22. The upper end of element 23 has an outside diameter which is less than the inside diameter of tube 19 to provide for the vent passage 21. Body structure element 23 has a central aperture 23c the upper end of which receives a third body structure element 24 and the lower end of which has a sand and resin fill 35 which is solidified by heat after being placed in the aperture 23c. Thus it may be observed that the body structure elements 22 and 23 plus the solidified sand and resin 35 provide walls defining cavity 22a and an entrance thereto to receive and retain a sample of molten material when the entrance is immersed in molten material.

Element 24, which as later described is made of plastic, has a base portion 24a, downwardly projecting portions 24b and 24d, and a stepped upwardly projecting portion 24e. The downwardly projecting portion 24b is, as mentioned above, received in passage 23c of body element 23. The downwardly projecting portion 24b includes an opening 24c through which extends a projection 24d of body 24 for supporting a sensing means. The sensing means has been illustrated in FIG. 2 as a thermocouple 25 housed in a U-shaped tube of refractory heat transmitting material in a manner taught in the above mentioned Mead patent. Elements of the thermocouple 25, as well understood by those skilled in the art, are connected to relatively heavy contact elements 26 and 27 portions of which extend upwardly through holes and grooves in body 24 and in the region of stepped portion 24e have bent over portions 26a and 27a respectively engaged with ring structures 29 and 30 of mating electromechanical connector structure 28. A connector having a stepped portion which supports contact elements for engagement with ring contacts which have different internal diameters is disclosed in U.S. Pat. No. 3,531,331-Davies.

Connector 28 is housed in metal fitting 15 and retained therein as by set screws or a pin 15a. The fitting 15 has a threaded end 15b for attaching it to the internally threaded end of pipe 14. The connector is preferably comprised of a body of molded elastomeric material which will successfully withstand relatively high temperatures. As taught in the above mentioned Parker patent, neoprene rubber having a durometer of 80–90 or equivalent resilient material has been found to be satisfactory. The ring contacts 29 and 30 are molded into the connector. These rings are secured to wires 31 and 32 which in turn are connected to conductors 17a, 17b of the cable 17 by means of crimp connectors 33,34. Since the sampler device of FIG. 2 only employs one sensing element only two of the ring contact structures of connector 28 are utilized although two more are provided for use in a manner later to be described. Obviously a two ring connector may be used instead of the four ring connector.

As mentioned above the sensing means 25 is supported by projection 24d of the body structure element 24. Prior to installation of the filling of sand and resin 35 electrical contact elements 26 and 27 are carefully sealed into body element 24 by means of a gas impervious sealing material 36 which may be a refractory cement. The sealing material 36 prevents any flow of gas exhausted from cavity 22a through the resin and sand fill 35 upwardly along the contact elements 26 and 27 and into the connector 28. Additionally to prevent the inward flow of gases into connector 28 the entire upper end of body element 23 is coated with a gas impervious sealing material 37 which upon plug-in engagement of the mating electromechanical connector structure effects a fluid tight abutting engagement with the elastomeric material 28a of the connnector 28. As taught in U.S. Pat. No. 3,531,331-Davies the material of body element 24 is preferably of a moldable plastic such as nylon, polyethylene, Bakelite, or a high impact polystyrene which materials are impervious to the flow of gas therethrough and cooperate to prevent flow of gas into the connector 28.

When using the device of FIG. 2 the tube 19 which contains assembled body structure elements 22, 23, and 24 and to which is affixed the cap 20 provides a smapler device 12 which may be slid over the fitting 15 and along the manipulator pipe 14 into plug-in engagement with the connector 28. The sampler may then be immersed to a subsurface level of a molten material such as steel. While the end of the sampler is passing through the slag layer the cap 20 prevents the ingress of slag into the sampler, however the cap soon melts permitting molten material to strike the disc 38 of deoxidizing material which in turn quickly melts, mixes with and is carried along with the molten material into the sampler and deoxidizes the molten material as it flows through the entrance 22b into the sample receiving cavity 22a. The sample flows into the cavity 22a due to the hydraulic head of the molten material and as it flows into the cavity 22a air and/or gases within the cavity are displaced and forced out through the porous material of body structure element 23 as indicated by arrows into the vent passage 21. The sealing material 36 prevents gas from flowing interiorly along the contact elements 26 and 27 and the sealant 37 prevents lateral flow of any gas from the vent passage 21 into the connector due to the tight butting engagement of the sealant 37 with the adjacent end of the elastomeric material 28a thus preventing the formation of desired deposits upon the contacts 26a, 27a, 29, and 30 of the plug-in connector. As known to those skilled in the art as soon as the sample flows into the sampler it begins to cool and the sensing device 25 which is connected to an automatic self-balancing recorder draws a curve wherein the rate of cooling of the material inside the sampler is plotted as a function of time. When the sample within the cavity 22a begins to freeze an arrest will appear on the cooling curve. This initial arrest is known as the liquidous arrest and from it the carbon equivalent may be determined if the sample be of molten iron, the carbon content if the sample be of molten steel, or for other materials the arrest may be employed for determination of a constituent of the material. After a few seconds the sample will have solidified sufficiently in the entrance 22b to permit withdrawal of the sampler from the bath of molten material and after a short time when freezing is complete the sampler device is easily broken apart and a sample comprised of a stem and cylindrical head is easily recovered. Those skilled in the sampling art will be aware of the fact that the shape of the sample is more or less a matter of choice and may be of almost any shape desired.

Figure 3:
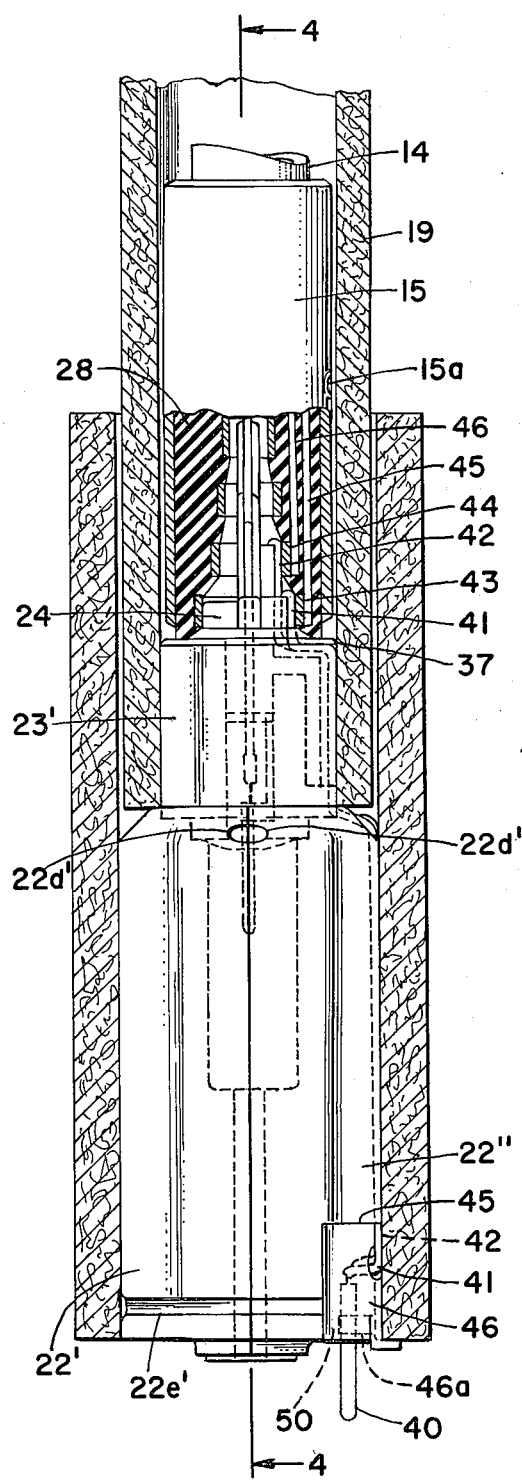
FIG. 3 is a side elevation partly in section of another modification of a sampler in accordance with applicant's invention.
Figure 4:
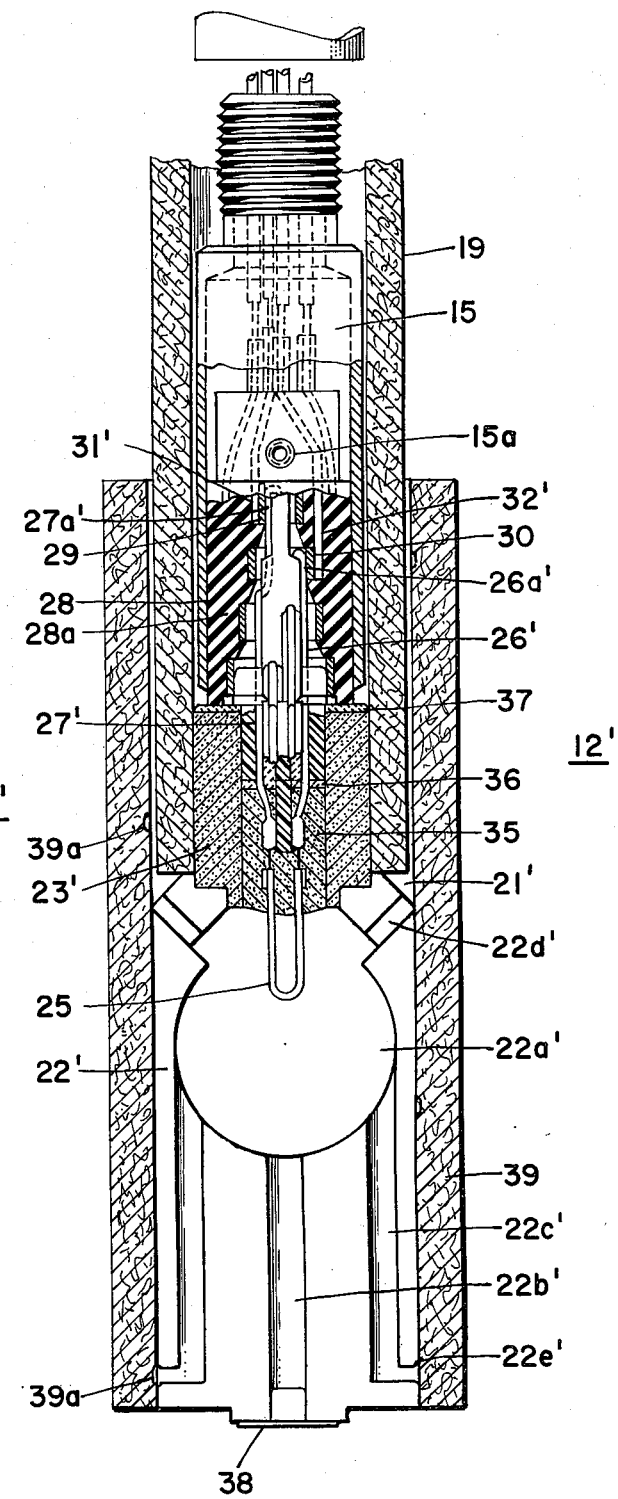
FIG. 4 is a side elevation partly in section taken along the line 4,4 of FIG. 3 additionally showing means to attach a manipulator.

FIGS. 3 and 4 are views of another form of sampler device employing directional venting in accordance with applicant's invention. Those parts which are the same as those described in connection with FIGS. 1 and 2 are given the same reference numerals, those parts which are somewhat different but perform the same function are given the same reference numerals as in FIG. 1 with a prime added, and parts which are different have been given different reference numbers.

FIG. 3 is a side elevation partly in section showing a sampler 12' wherein the lowermost portion of the body structure is comprised of a pair of molded halves 22' and 22" which may be made of a suitable ceramic or of shell molded parts. To the extent that the molded halves are identical reference should be made to FIG. 4 showing the molded half 22'. EAch molded half contains a substantially cyclindrical recess 22a' and a half round recess 22b' which when mated and joined with other body parts provide wall structure defining a cavity identified as 22a' and an entrance thereto identified as 22b'. These two molded halves 22' and 22" additionally have a pair of half round grooves 22c' which when mated form venting means for the outward flow of gases from the cavity 22a' into a passage 22e' formed by mating exterior grooves for reasons later to be described. Additionally each of the molded halves has a pair of grooves 22d' which when mated form venting means through which gases from the sample receiving cavity 22a' may be discharged into a venting passage 21'. In the modification of the sampler device of FIGS. 3 and 4 the molded halves 22' and 22" when assembled are inserted into a convolute wound cardboard tube 39 which has an interiorly disposed spiral groove 39a throughout the length thereof which connects at its lower end with passage 22e' and at a point upwardly therefrom connects with venting passage 21'. If other materials be used for tube 39 a suitable internal groove can be included. The internal diameter of the tube 39 is somewhat in excess of the outside diameter of the tube 19 to form a continuation of the passage 21' between the two tubes. Thus, gas which is forced from the cavity 22a' through the venting means 22c, 22e', spiral groove 39a and venting means 22d' into the passageway 21' is vented upwardly and outwardly between the two tubes 19 and 39. The thermocouple 25' is mounted in substantially the same way as the thermocouple 25 of FIG. 1 and the sealing material 36 prevents the flow of gaseous materials up along the conductors 26' and 27' into the connector 28' and sealing material 37 is included to guard against entry of gas into the connector from tube 19.

In the modification of FIGS. 3 and 4 all of the contact rings of connector 28 are used to establish connection with heat sensing devices. In view of the similarity of the electrical connections of the sampler devices it is believed unnecessary to describe in detail the electrical connections shown in FIGS. 3 and 4.

Body element 23' varies only slightly in shape from the body 23 of FIG. 2. The lower end of body 23' has a shape to mate with the upper end of the body structure formed by moled halves 22' and 22". The outer diameter of body element 23' is cylindrical and a tight fit in the tube 19 and the top face of body 23' is covered with sealing material 37 which abutts the elastomeric material 28a of connector 28. Thus as may be observed from FIG. 4 no gaseous material may leak into the connector 28 either internally due to the sealing material 36 or from the top of body element 23' due to the presence of the sealing material 37.

As may be seen in FIG. 3 body element 22" includes a notched portion 45 into which is nested a support 46 for a thermocouple 40 housed in a U-shaped refractory sheath in substantially the same manner as is thermocouple 25'. Support 46 may be a thin walled cylindrical section of plastic having integral therewith a pair of resilient arms 46a for gripping the ends of the U-shaped refractory sheath in known manner. This thermocouple is connected to electrical contact elements 41 and 42 which pass upwardly through suitable grooves in body elements 22", 23', and 24 for connection to contact rings 43 and 44 of connector 28. The thermocouple 40 projecting outwardly from the sampler device 12' will measure the temperature of the bath of material into which the sampler device is immersed. A quantity of refractory cement 50 is deposited within the plastic member 46 to seal thermocouple 40 in position.

The sampler device 12" of FIG. 5 employs or is provided with two heat sensing devices 25 and 40. The body structure includes a first body structure element 122 which is desirably of shell molded sand. This body element has walls defining a cavity 122a and an entrance thereto 122B. The upper end of cavity 122a is closed by the lower end of body element 23 having a through hole 23c with a portion thereof filled with a mixture of sand and resin which cured or hardened by the application of heat. The body structure additionally includes a plastic body element 124 having a cone shaped annular portion 124a from which depends a cylindircal portion 124b having a counterbore 124c through which depends a thermocouple supporting element 124d. Extending upwardly from the cone shaped portion 124a is a tubular portion 124e for supporting the bent over portions 26a, 27a, 42a, and 41a of thermocouples 25 and 40. These electrical connections have been illustrated diagrammatically inasmuch as connectors having a tubular support are well known to those skilled in the art and are illustrated in greater detail in the above mentioned Parker, Jr., Boyle, and Davies patents. In order to seal the electromechanical connector structure against the ingress of gases vented from the cavity 122a through the walls of element 23, as indicated by the arrows, the conical section 124a of body structure element 124 engages a mating conical section of elastomeric material 28a' of the connector 28'. In this manner gases are prevented from entering the connector from the vent passage 21. Since the plastic body element 124 is impermeable to gas no sealing material such as sealant 37 is needed across the end of body element 23. The gas impermeable sealant 36 is still utilized to prevent the ingress of gases through the center of body 124 along the electrical contact elements 26 and 27.

In order to support the thermocouple 40 there is utilized a body structure member 47. This element may be a sleeve of a plastic material having a cylindrical section 47a which is a tight fit in the end of tube 19 and which has an internal diameter adapted to receive in sliding engagement therewith an undercut cylindrical section 122c of body element 122. This undercut cylindrical section 122c is provided with a notched-out portion 122d which receives a thermocouple support element not shown which may be like element 46 nested in the notched-out portion 45 of FIG. 3. Body element 47 additionally includes an enlarged cylindrical section 47b the outside diameter of which is substantially the same as the outside diameter of tube 19. This forms a shallow cup which may be filled with cement 50 to protect the lower end of tube 19 and retain the thermocouple 40 in place.

In the modification of FIG. 5 the gases vented from cavity 122a will flow outwardly as indicated by the arrows. Gas is prevented from entering the connector 28' by the gas impermeable sealing material 36 which prevents the flow of gas upwardly along the contact elements 26 and 27 and the tapered or conelike portion 124a of plastic body element 124 which fits like a cork in the cone shaped end of elastomeric material 28a' of connector 28'. In view of the similarity of various parts of FIG. 5 to those already described in connection with the sampler modifications disclosed in FIGS. 1–4 it is believed that further description of the modification of FIG. 5 is unnecessary.

In FIG. 6 there is disclosed a modification of an immersion sampler device provided with directional venting in accordance with applicant's invention. The sampler of FIG. 6 is identical with that of FIG. 5 except for the addition of electrode structures for determination of a gaseous constituent in a bath of molten material to be sampled.

In the sampler device 12''' a connector electrode 48 and a reference electrode 49 including a solid electrolyte 49a are supported along with the thermocouple 40 in the notched-out portion 122d of body element 122. These electrodes together with the molten material of the bath into which the sampler is immersed form a galvanic cell. Much has been accomplished toward the development of electrode assemblies suitable for insertion into a bath of molten metal such as liquid iron or steel to form therewith a galvanic cell for determination of the concentration of oxygen dissolved in the molten metal. The state of the art as of 1968 and a brief historical review of developments is set forth in a paper prepared for presentation at the 76th General Meeting of American Iron and Steel Institute, in New York, May 23, 1968, by E. T. Turkdogan and R. E. Fruehan entitled "Rapid Oxygen Determination in Liquid Steel". A copy of the paper is available upon request from the American Iron and Steel Institute, 150 E. 42nd Street, New York, New York 10017. Suitable electrode structure including a thermal switch is disclosed in U.S. Pat. No. 3,785,947-W. H. Baldwin et al.

The electrical connections for the sensing elements of the sampler device of FIG. 6 have been shown diagrammatically in order to simplify the drawings. The sensing device shown as a thermocouple 25 has its electrical contact element 26 connected to ring contact 53 of connector 28' and its electrical contact element 27 connected to ring 51. The thermocouple 40 has its contact element 41 connected to ring contact 52 of connector 28' and its connector element 42 connected to and made common with connector element 27 of thermocouple 25. A connector element 55 of electrode 48 is connected to ring contact 54 of the connector 28' and connector element 56 of reference electrode 49 is connected to connector element 42 and made common therewith. By utilizing a common connection for one leg of thermocouple 25, one leg of thermocouple 40, and reference electrode 49 it is possible to utilize an electromechanical connector structure having only four contacts. From the foregoing it will be evident that a four-ring connector either of the type disclosed in FIGS. 2, 3, and 4 or of the type 28' as shown in FIGS. 5 and 6 is suitable for use with one, two, or three sensing elements of the types described. The ability to use a single connector for different types of units has an advantage in that standard wiring procedures can be adapted so that any of the different types of sampler devices may be used with the same manipulator assembly.

In view of the similarity between the sampler devices of FIGS. 5 and 6 it is believed that further description of FIG. 6 is unnecessary. As may be noted from the drawings the sealing material 36 employed in the various modifications of applicant's samplers is effective to prevent the flow of gaseous materials along the conductors 26 and 27 into the electromechanical connector structures and the tapered seat 24a of body element 124 effectively prevents the flow of gaseous material inwardly of the electromechanical connector structure from the vent passage 21.

While no fusible cap 20 has been shown associated with the devices of FIGS. 3–6 it is to be understood that such a cap may be included and made a part of the sampler devices when deemed necessary.

In each of the modifications of the sampler devices shown by applicant the body elements may be made of porous material or of material which are impermeable to the flow of gas therethrough. In each modification directional venting is provided together with barriers to the flow of gaseous materials into the electromechanical connector structure to prevent fouling of the contacts thereof. While specific structures have been described and used for illustrative purposes it is to be understood that different materials, different sensing devices, and different configurations of parts may be employed in devices utilizing applicant's directional venting concepts for protection of the electromechanical connector structure of immersion samplers.

What is claimed is:

1. A sampler device for molten material including temperature sensing means and plug-in electromechanical connector structure comprising:
   body structure having walls defining a cavity and an entrance thereto to receive and retain a sample of molten material when said entrance is immersed in molten material,
   said body structure supporting temperature sensing means at a location to sense the temperature of said molten material,
   said body structure supporting an electromechanical connector structure having electrical contact elements electrically connected to said temperature sensing means, said connector structure being constructed and arranged for engagement with mating connector structure supported at an end of a manipulator assembly,
   a tubular member supporting said body structure in an end thereof and having a length sufficient to surround one end of the manipulator assembly and said connector structure,
   a passageway provided between said tubular member and a portion of said body structure and the manipulator,
   venting means through one of said walls defining said cavity for venting gas from said cavity into said passageway, and
   means preventing gas exhausted through said venting means into said passageway from entering said connector structure when engaged with the mating connector structure of the manipulator to prevent the formation of deposits on the electrical contacts of the connector structures.

2. A sampler device according to claim 1 wherein said electromechanical connector structure includes a portion of gas impermeable material for effecting a fluid tight engagement with a mating connector structure.

3. A sampler device for molten material said device including a body having wall structure defining a cavity and an entrance thereto for receiving and retaining a sample of molten material, said body supporting one or more sensing means having an electrical output the magnitude of which is a function of a characteristic of the molten material, said body being supported in an end of a tubular member, said body supporting electromechanical connector structure at an end thereof in said tubular member with electrical contacts thereof in electrical connection with said sensing means, the improvement comprising a vent passage between a portion of said body and said tubular member at the end of said body supporting said connector, means providing a passage for the flow of gas from said cavity to said vent passage, and means to seal the connector structure against the ingress of gases vented from said cavity.

4. A sampler device according to claim 3 wherein said wall structure defining a cavity is comprised of mating mold halves and said means providing a passage is comprised of mating grooves in said mold halves.

5. A sampler device according to claim 3 wherein said wall structure defining a cavity is comprised of porous material permeable to gas for venting gas from said cavity into said passageway and said means preventing gas from entering said connector structure comprises gas impermeable material disposed between said wall structure defining a cavity and said connector structure.

6. A sampler device according to claim 5 wherein said means preventing gas from entering said connector structure includes a coating of material impermeable to gas across an end face of said body for engaging an elastomeric material portion of a mating electromechanical connector structure when the electromechanical connector structure of said device is in plug-in engagement with that of a manipulator.

7. A sampler device according to claim 3 wherein said temperature sensing means projects outwardly from said body to sense the temperature of molten material into which said entrance structure is immersed.

8. A sampler device according to claim 3 wherein said temperature sensing means projects into said cavity to sense the temperature of molten material in the cavity.

9. A sampler device according to claim 3 wherein said temperature sensing means is comprised of a temperature sensing means projecting into said cavity and a temperature sensing means projecting outwardly from said body.

10. A sampler device according to claim 3 wherein said sensing means includes an electrochemical cell element projecting outwardly from said body.

11. A sampler device according to claim 10 including an electrode projecting outwardly from said body.

12. A sampler device according to claim 10 additionally including a temperature sensing means projecting into said cavity.

13. A sampler device according to claim 10 additionally including a temperature sensing means projecting outwardly from said body.

14. A sampler device according to claim 10 additionally including a temperature sensing means projecting into said cavity and a temperature sensing means projecting outwardly from said body.

* * * * *